Dec. 24, 1935.   H. N. ATWOOD   2,025,033
AIRPLANE
Filed July 31, 1934
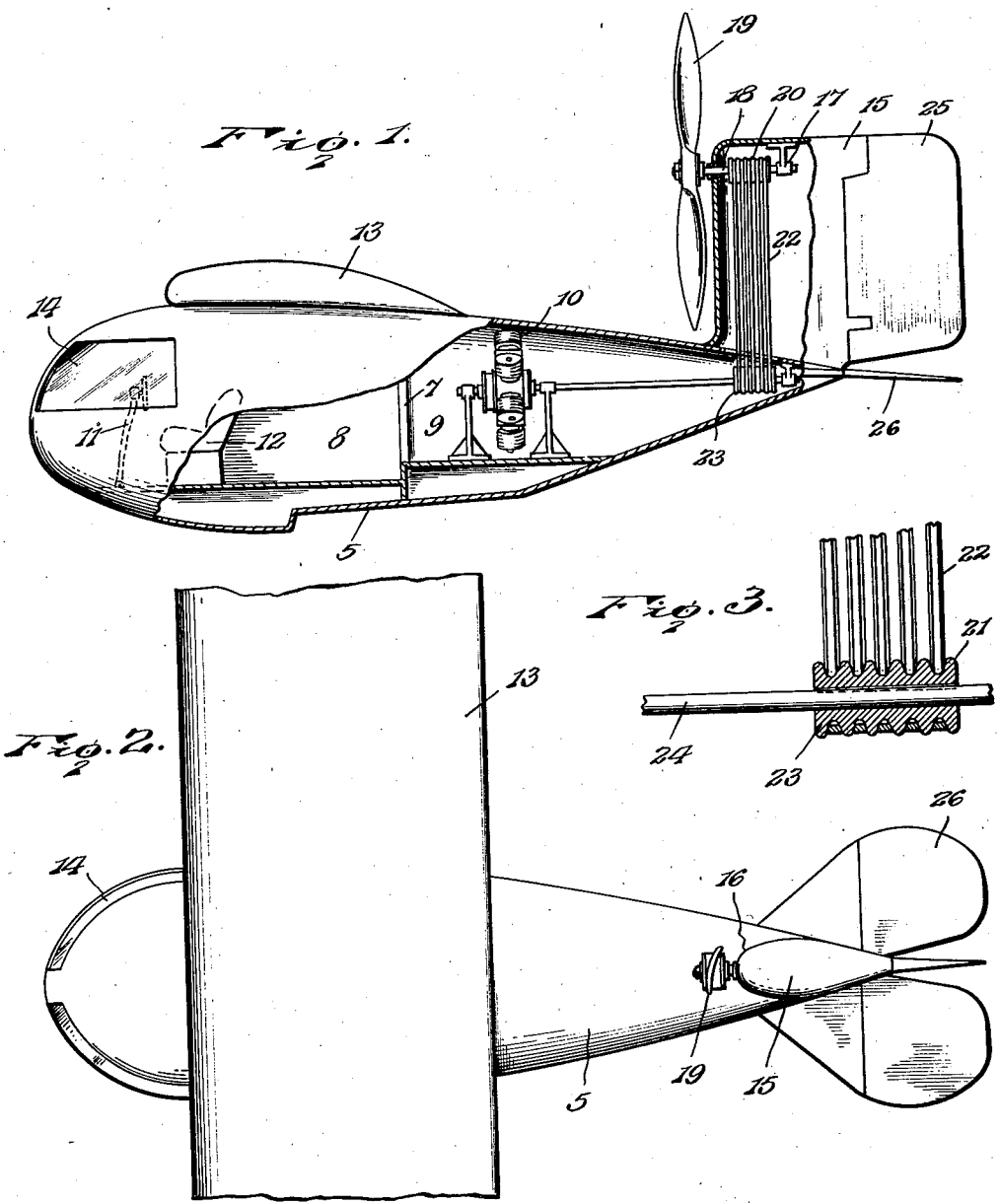
Inventor
Harry N. Atwood.
By Lacey & Lacey, Attorneys Patented Dec. 24, 1935

2,025,033

UNITED STATES PATENT OFFICE 2,025,033

AIRPLANE

Harry N. Atwood, South Lyndeboro, N. H.

Application July 31, 1934, Serial No. 737,841

10 Claims. (Cl. 244—25)

This invention relates to airplanes of the pusher type and more particularly to means for transmitting motion from the motor to the propelling mechanism.

The object of the invention is to provide an airplane, the propelling mechanism of which is combined with the rudder and tail elements, thereby materially reducing head resistance and consequently permitting higher speeds with maximum fuel economy.

A further object of the invention is to provide an airplane, the construction of which is such as to permit the operator to have a wide range of visibility in all directions and in which frontal noises incident to running of the motor and rotation of the propeller will practically be eliminated, and the blowing of rain, sleet, dirt and other foreign material against the windows reduced to a minimum.

A further object is to mount the motor in the fuselage and to transmit motion from the motor to the propeller by a series of independent flexible belts so constructed and arranged that should breakage of the propeller occur, the centrifugal or disruptive force incident thereto will be received and absorbed by the flexible driving belts and thus prevent damage to or displacement of the motor, as well as injury to the operator.

Further objects and advantages will appear in the course of the following description.

In the accompanying drawing forming a part of this specification and in which similar numerals of reference indicate corresponding parts in all the views of the drawing:

Figure 1 is a vertical sectional view of an airplane constructed in accordance with the present invention.

Figure 2 is a top plan view partly broken away.

Figure 3 is a detail sectional view of one of the driving pulleys with the belts in position thereon.

Figure 4 is a detail sectional view of a portion of the body or fuselage showing the preferred manner of constructing the same.

The improved airplane, forming the subject-matter of the present invention, comprises a body or fuselage 5 of any desired length, height and contour and formed of any suitable material, although it is preferred to construct the same of cellular material consisting of tubular laminated members 6 impregnated with rubber and securely bonded together, as best shown in Figure 4 of the drawing, so as to produce a structure light in weight and having the desired strength, toughness and stability. The body or fuselage 5 is provided with a transverse partition 7 defining front and rear compartments 8 and 9, one of which is adapted to receive a motor 10 of any desired or approved construction, the other or front compartment constituting a cabin in which is mounted the usual controls 11 and the pilot's seat, indicated at 12. The plane is provided with the usual sustaining wings 13 and the cabin at the nose of the plane is constructed with oppositely disposed windows 14 to permit the pilot to make proper observations.

Secured to or formed integral with the rear end of the body or fuselage is a vertical fin or stabilizer 15, preferably hollow in cross section, and having its forward edge curved at 16 so as to decrease wind resistance. Journaled in suitable bearings 17 within the fin, at the upper portion thereof, is a stub shaft 18, one end of which projects through the curved edge 16 and to which is keyed or otherwise secured a propeller 19. Keyed or otherwise secured to the stub shaft 18 is a pulley 20 having a plurality of independent V-shaped seats 21 formed therein and adapted to receive independent flexible elements 22, preferably formed of leather and V-shaped in cross section, said elements 22 being trained around a corresponding pulley 23 secured to the drive shaft 24 of the motor 10, as best shown in Figure 1 of the drawing. The airplane is provided with a rudder 25, preferably of the same height as the fin and movably connected therewith, elevating planes 26 being also provided, as shown. By combining the propeller drive with the rudder and tail elements in this manner, a material reduction in head resistance is effected when in flight, thereby permitting higher speeds with maximum fuel economy.

The mounting of the propeller 19 at the rear of the pilot's seat permits the operator to have a wide range of visibility in all directions and at all times and as the motor, as well as the propeller, is carried by the rear portion of the airplane, frontal noises incident to the running of the motor and rotation of the propeller are practically eliminated and the blowing of rain, sleet, dirt and other foreign materials against the windows 14 is reduced to a minimum.

Owing to the flexibility of the driving elements or belts 22, should breakage of the propeller occur, the centrifugal or disruptive force incident thereto will be received and absorbed by said flexible driving elements and thus prevent damage to or displacement of the motor and consequent injury to the operator.

Furthermore, the location of the propeller at the tail of the plane prevents the throwing of sprays during take-offs or landings, particularly when the propeller is used in connection with a hydroairplane or amphibian and, as the propeller is disposed entirely above the body 5 and elevator 26, there is no obstruction in the path of the air from said propeller and no danger of stones, sticks and other material on the ground being picked up and broadcast during the rotation of the propeller. When the propeller is mounted at the front or nose of the plane damage to the propeller often occurs by impact with different objects and liability of such damage is entirely obviated by having the propeller at the tail of the plane, as will be readily understood. It will, therefore, be seen that, by mounting the motor and propeller in the manner described, not only is the motor effectually housed from the elements and protected from damage or displacement in case of breakage of the propeller, but said propeller is also protected from ice, snow, water or field dirt.

An airplane constructed in accordance with the present invention has a low center of gravity, decreased head resistance, perfect visibility, and may be safely operated under all conditions of service and with a minimum consumption of fuel.

While the driving elements are shown applied to a monoplane, it will, of course, be understood that said elements may be used in connection with any type of aircraft without departing from the spirit of the invention.

Having thus described the invention, I claim:

1. An airplane including a fuselage, vertical tail fin and rudder, a motor housed within the fuselage, a propeller mounted for rotation on the forward edge of the tail fin, and a flexible driving element connecting the propeller and motor.

2. An airplane including a fuselage, vertical tail fin and elevators, a motor housed within the fuselage, a propeller mounted for rotation on the tail fin and disposed entirely above the elevators, and a series of independent flexible driving elements connecting the propeller and motor.

3. An airplane including a fuselage, vertical tail fin and elevators, a motor housed within the fuselage and provided with a driving shaft, a stub shaft journaled in the tail fin and projecting longitudinally from the forward edge thereof, a propeller carried by the projecting end of the stub shaft and disposed entirely above the elevators, pulleys secured to the drive and stub shafts, and independent flexible belts trained around said pulleys.

4. An airplane including a fuselage, vertical tail fin and rudder, a motor housed within the fuselage and provided with a driving shaft, a stub shaft journaled in and projecting forwardly from the tail fin, a propeller carried by the projecting end of the stub shaft and disposed entirely above the top of the fuselage, pulleys secured to the drive and stub shafts and provided with spaced substantially V-shaped peripheral seating grooves, and independent flexible belts substantially V-shaped in cross section trained about the pulleys and seated in said grooves.

5. An airplane including a fuselage, vertical tail fin and rudder assembly, a motor housed within the fuselage at the rear of the pilot's seat, a propeller mounted for rotation on the forward edge of the tail fin, a stub shaft to which the propeller is connected, a driving shaft leading from the motor, and independent flexible driving elements forming a connection between the stub shaft and driving shaft for transmitting motion from the motor to the propeller.

6. An airplane including a fuselage having a hollow tail fin projecting vertically from the upper surface thereof and communicating with the fuselage, a motor housed within the fuselage, a stub shaft journaled in the hollow tail fin, a driving shaft connected with the motor, grooved pulleys carried by the driving and stub shafts, a propeller mounted on the stub shaft and disposed entirely above the top of the fuselage, and independent flexible driving elements extending over the pulleys and housed within the tail fin.

7. An airplane including a fuselage having front and rear compartments, one of which is provided with unobstructed windows, a motor housed within the other compartment and provided with a driving shaft, a hollow upstanding tail fin communicating with the motor compartment, a stub shaft journaled within the upper portion of the tail fin and having one end thereof projecting through the forward edge of said tail fin, a propeller, an air fan mounted on the projecting end of the stub shaft, grooved pulleys carried by the stub and drive shafts, and independent flexible driving belts encircling the pulleys and housed within the hollow tail fin.

8. An airplane including a fuselage, elevators and a hollow upstanding tail fin communicating with said fuselage, a motor housed within the fuselage and having a low center of gravity, a driving shaft extending longitudinally from the motor to a point beneath the tail fin, a stub shaft journaled in the upper portion of the tail fin and having one end thereof extending through a bushing in the forward edge of the tail fin, a propeller fan secured to the projecting end of the stub shaft and disposed entirely above the elevators, grooved pulleys secured to the driving shaft and stub shaft, respectively, and flexible elements extending over and seated within the grooves of the pulleys and housed within the tail fin.

9. An airplane having a tail assembly including a tail body and vertical tail fin, and a propeller carried by the fin and disposed in front of the fin and entirely above the tail body.

10. An airplane having a tail assembly including a tail body, vertical tail fin and elevators, and a propeller carried by the fin and disposed in front of said fin and entirely above the elevators.

HARRY N. ATWOOD.